United States Patent
Sone

(10) Patent No.: US 7,362,161 B2
(45) Date of Patent: Apr. 22, 2008

(54) POWER SUPPLY SWITCHING CIRCUIT, DATA PROCESSING DEVICE, AND METHOD OF CONTROLLING DATA PROCESSING DEVICE

(75) Inventor: Toshihisa Sone, Miyazuki (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 136 days.

(21) Appl. No.: 11/341,371

(22) Filed: Jan. 30, 2006

(65) Prior Publication Data
US 2006/0212137 A1  Sep. 21, 2006

(30) Foreign Application Priority Data
Feb. 25, 2006 (JP) ............... 2005-049998

(51) Int. Cl.
*G11C 5/14* (2006.01)
(52) U.S. Cl. .................. 327/530; 327/407
(58) Field of Classification Search ........ 327/530, 327/407, 408
See application file for complete search history.

(56) References Cited

U.S. PATENT DOCUMENTS 5,502,682 A * 3/1996 Yoshimura ............... 365/226

RE36,179 E * 4/1999 Shimoda ............... 327/407

FOREIGN PATENT DOCUMENTS

JP  10-243573  9/1998

* cited by examiner

*Primary Examiner*—Quan Tra
(74) *Attorney, Agent, or Firm*—Donald R. Studebaker; Nixon Peabody LLP

(57) ABSTRACT

A power supply switching circuit includes a detection circuit which detects a reduction in a voltage level of the main power supply and outputs a detection signal; a first switch circuit which connects a main power supply to an internal power supply node before a reduction in voltage level is detected and disconnects the main power supply from the internal power supply node when the reduction in voltage level to the predetermined detection level is detected; and a second switch circuit which disconnects the subordinate power supply from the internal power supply node before a reduction in voltage level is detected, connects the subordinate power supply to the internal power supply node from when the reduction in voltage level is detected to when the data backup is completed and subsequently disconnects the subordinate power supply from the internal power supply node when the data backup is completed.

8 Claims, 6 Drawing Sheets

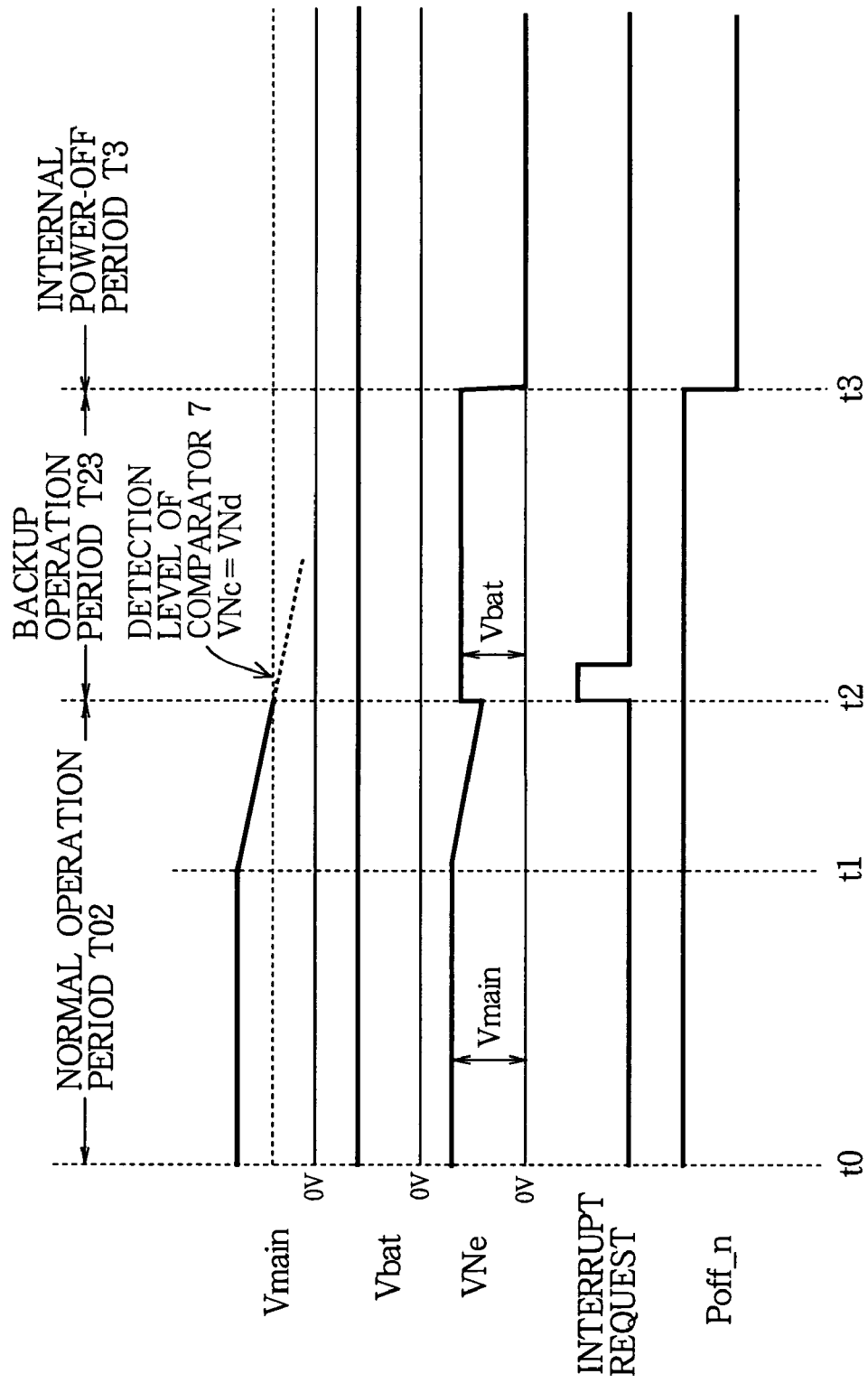

POWER SUPPLY SWITCHING CIRCUIT, DATA PROCESSING DEVICE, AND METHOD OF CONTROLLING DATA PROCESSING DEVICE

BACKGROUND OF THE INVENTION

1. Field of the Invention

The present invention relates to a data processing device such as a microcomputer which is generally incorporated in an electronic device such as a mobile terminal device powered by a battery power supply. The present invention also relates to a power supply switching circuit and a method of controlling a data processing device used in a system capable of receiving power from a plurality of power supplies such as a main power supply and a subordinate power supply. In particular, the present invention relates to a power supply switching circuit for switching a power supply in a data processing device and a method of controlling a data processing device that are used in the power supply switching and controlling process (including data backup process involved in the power supply switching process) when an output voltage level of a power supply falls.

2. Description of the Related Art

In a conventional system including a single power supply, an output voltage level of a power supply is monitored by a detection circuit including a battery voltage reduction detection circuit and an AD converter. When the detection circuit detects a reduction in the output voltage level of the power supply, the system raises an alarm and/or performs power-down processing.

In another conventional system including a plurality of power supplies, the system is normally powered by a main power supply, and when an output voltage level of the main power supply falls, the system switches the power supply so as to be powered by a standby power supply (i.e., a subordinate power supply).

FIG. 1 is a diagram showing a circuit configuration of a conventional microcomputer. The microcomputer shown in FIG. 1 is a system including a plurality of power supplies and switches a power supply for supplying power to an internal circuit of the microcomputer from a main power supply Vmain to a subordinate power supply Vbat when detecting a reduction in the output voltage level of the main power supply Vmain.

Referring to FIG. 1, the microcomputer includes the main power supply Vmain, the subordinate power supply Vbat, a power supply switching circuit 100, and an internal circuit powered through the power supply switching circuit 100 by the main power supply Vmain or the subordinate power supply Vbat. The internal circuit includes a CPU 11, a memory 12, a peripheral circuit (i.e., a peripheral) 13, a bypass capacitor 14, an oscillation circuit (OSC) 15, and a CPU bus 16. The power supply switching circuit 100 includes voltage dividing resistors 4 and 5 (i.e., a voltage dividing resistor circuit), a reference voltage generating circuit 6, a comparator 7, PMOS transistors 8 and 10, and an inverter 9.

In the power supply switching circuit 100, the comparator 7 compares a divided voltage of the main power supply Vmain (i.e., a voltage level NNd of a node Nd) with a reference voltage VNc output from the reference voltage generating circuit 6 (i.e., a voltage level VNc of a node Nc). When the voltage level VNd of the node Nd is higher than the voltage level VNc of the node Nc (i.e., when VNd>VNc), the output of the comparator 7 (i.e., a node Nf) is at "L (low)" level which indicates that the output voltage level of the main power supply Vmain is normal, and the output of the inverter 9 is at "H (high)" level, and hence the PMOS transistor 8 is closed (i.e., turned on) and the PMOS transistor 10 is opened (i.e., turned off). At this time, power is supplied from the main power supply Vmain to an internal power supply node Ne via the PMOS transistor 8 to operate the CPU 11, the memory 12, the peripheral circuit 13, and the oscillation circuit 15, whereas the subordinate power supply Vbat is disconnected from the internal power supply node Ne and hence power is not supplied from the subordinate power supply Vbat to the internal power supply Ne.

In the course of time, the remaining power of the main power supply Vmain decreases, the output voltage level of the main power supply Vmain falls, and then the voltage level VNd of the node Nd becomes not higher than the voltage level VNc of the node Nc (i.e., VNd≦VNc). At this time, the output voltage level of the comparator 7 is brought to "H" level indicating that a reduction in the voltage level of the main power supply Vmain is detected, the output voltage level of the inverter 9 is brought to "L" level, and hence the PMOS transistor 8 is turned off and the PMOS transistor 10 is turned on. Therefore, the main power supply Vmain is disconnected from the internal power supply node Ne and a power supply to the internal power supply node Ne is switched from the main power supply Vmain to the subordinate power supply Vbat, whereby the CPU 11, the memory 12, the peripheral circuit 13, and the oscillation circuit 15 are powered by the subordinate power supply Vbat until the main power supply Vmain is recovered.

In this manner, the microcomputer 100 switches the main power supply Vmain to the subordinate power supply Vbat when a reduction in the voltage level of the main power supply Vmain is detected. Therefore, even when the voltage level of the main power supply Vmain falls and the internal circuit such as the CPU 11 and the memory 12 cannot operate on the main power supply Vmain, the internal circuit can operate on the subordinate power supply Vbat. In other words, the microcomputer 100 is constructed so as to be powered by the subordinate power supply Vbat when the voltage level of the main power supply Vmain falls.

Moreover, the Japanese Patent Application Kokai (Laid-Open) Publication No. 10-243573 discloses another conventional power supply switching circuit that includes two power supplies of a main battery and a backup battery and is intended for elongating the life of the backup battery by preventing the backup battery from being over-charged and over-discharged. The power supply switching circuit operates as follows. A backup battery is charged to a constant voltage by the main battery. When the voltage level of the main battery falls, the backup battery starts discharging (i.e., the backup battery starts supplying power), and when a reduction in the voltage level of the backup battery is detected, the backup battery stops discharging in order to prevent the backup battery from being over-charged and over-discharged.

In the above-described system including a single power supply, the microcomputer controls the battery voltage reduction detecting circuit, the AD converter and so on, detects a reduction in the output voltage level of the power supply, and performs power-down processing and so on. Then, the detection level of a reduction in the voltage level of the power supply needs to be within an operation guaranteeing range in which the operation of elements of the internal circuit is guaranteed and, it is preferable that the detection level is close to the lower limit of the operation guaranteeing range.

However, when a reduction in the voltage level of the power supply is steep, there is a probability that the power-down processing and data backup processing after the detection of a reduction in the voltage level of the power supply is too late to keep data, thereby causing disappearance of data. When the detection level is set at a higher level in order to eliminate this probability, all of the capacity of the main power supply is not used, which becomes uneconomical. In this manner, in the above-described system including a single power supply, it is difficult to set the detection level.

Moreover, in the above-described system including a plurality of power supplies including a main power supply and a subordinate power supply, even when the voltage level of the main power supply becomes lower than the operation guaranteeing range, power is supplied to the system from the subordinate power supply in addition to the main power supply or from only the subordinate power supply. In this system, even when the detection level is set at a level close to the lower limit of the operation guaranteeing range, it is possible to prevent disappearance of data.

However, in many cases, a large-capacity battery including a primary battery such as a dry battery and a secondary battery such as a lithium ion battery is employed. In the mobile terminal device, the reduction in the physical size of the device is required and the subordinate power supply is used only when the voltage level of the main power supply falls and hence the same large-capacity battery as the main power supply is hardly employed as the subordinate power supply. A small-size button battery is employed as the subordinate battery in many cases. However, the capacity of the button battery is smaller than that of the main power supply. Therefore, if the system continuously operates on the button battery in the same manner as the main power supply, the life of the button battery expires in a short time.

Furthermore, in the mobile terminal device, a portion where the button battery of the subordinate power supply is mounted is complex and hence the button battery cannot be taken out simply in many cases. There is also a case where a customer is not allowed to replace the button battery. In these cases, it is not desired that the mobile terminal device is driven by the subordinate power supply for a long time.

SUMMARY OF THE INVENTION

It is an object of the present invention to provide a power supply switching circuit, a data processing device, and a method of controlling a data processing device that can prevent disappearance of data even when a voltage level of a power supply falls and minimize power consumption of a subordinate power supply.

According to one aspect of the present invention, a power supply switching circuit for switching power supplied to an internal power supply node in a data processing device from a main power supply to a subordinate power supply, the data processing device including an internal circuit which receives power via the internal power supply node, includes: a detection circuit which detects a reduction in a voltage level of the main power supply to a predetermined detection level, the detection circuit outputting a detection signal for causing the internal circuit to perform data backup when the reduction in the voltage level to the predetermined detection level is detected by the detection circuit; a first switch circuit disposed between the main power supply and the internal power supply node, wherein the first switch circuit connects the main power supply to the internal power supply node before the reduction in the voltage level to the predetermined detection level is detected by the detection circuit and disconnects the main power supply from the internal power supply node when the reduction in the voltage level to the predetermined detection level is detected by the detection circuit; and a second switch circuit disposed between the subordinate power supply and the internal power supply node, wherein the second switch circuit disconnects the subordinate power supply from the internal power supply node before the reduction in the voltage level to the predetermined detection level is detected by the detection circuit, connects the subordinate power supply to the internal power supply node from when the reduction in the voltage level to the predetermined detection level is detected by the detection circuit to when the data backup is completed in the internal circuit, and subsequently disconnects the subordinate power supply from the internal power supply node when the data backup is completed in the internal circuit.

According to another aspect of the present invention, a power supply switching circuit for supplying power to a first internal power supply node and a second internal power supply node in a data processing device; the data processing device including a first internal circuit which receives power via the first internal power supply node from a main power supply, and a second internal circuit which receives power via the second internal power supply node from the main power supply or a subordinate power supply), second internal circuit including a memory, includes: a detection circuit which detects a reduction in a voltage level of the main power supply to a predetermined first detection level and a reduction in a voltage level of the main power supply to a predetermined second detection level lower than the first detection level, the detection circuit outputting a first detection signal when the reduction in a voltage level to the first detection level is detected, the first detection signal causing the first internal circuit receiving power supplied from the first internal power supply node to stop operating and to inhibit access to the memory receiving power supplied from the second internal power supply node, the detection circuit outputting a second detection signal when the reduction in a voltage level to the second detection level is detected; a first switch circuit disposed between the main power supply and the first internal power supply node, wherein the first switch circuit connects the main power supply to the first internal power supply node before the reduction in the voltage level to the first detection level is detected by the detection circuit and disconnects the main power supply from the first internal power supply node when the reduction in the voltage level to the first detection level is detected by the detection circuit; a second switch circuit disposed between the main power supply and the second internal power supply node, wherein the second switch circuit connects the main power supply to the second internal power supply node before the reduction in the voltage level to the second detection level is detected by the detection circuit and disconnect the main power supply from the second internal power supply node when the reduction in the voltage level to the second detection level is detected by the detection circuit; and a third switch circuit disposed between the subordinate power supply and the second internal power supply node, wherein the third switch circuit disconnects the subordinate power supply from the second internal power supply node before the reduction in the voltage level to the second detection level is detected by the detection circuit and connects the subordinate power supply to the second internal power supply node when the reduction in the voltage level to the second detection level is detected by the detection circuit.

According to yet another aspect of the present invention, a method of controlling a power supply switching circuit, the power supply switching circuit switching power supplied to an internal power supply node in a data processing device from a main power supply to a subordinate power supply, the data processing device including an internal circuit which receives power via the internal power supply node, includes: detecting a reduction in a voltage level of the main power supply to a predetermined detection level; outputting a detection signal for causing the internal circuit to perform data backup when the reduction in the voltage level to the predetermined detection level is detected; connecting the main power supply to the internal power supply node before the reduction in the voltage level to the predetermined detection level is detected and disconnecting the main power supply from the internal power supply node when the reduction in the voltage level to the predetermined detection level is detected; and disconnecting the subordinate power supply from the internal power supply node before the reduction in the voltage level to the predetermined detection level is detected, connecting the subordinate power supply to the internal power supply node from when the reduction in the voltage level to the predetermined detection level is detected to when the data backup is completed in the internal circuit, and subsequently disconnecting the subordinate power supply from the internal power supply node when the data backup is completed in the internal circuit.

According to yet another aspect of the present invention, a method of controlling a power supply switching circuit, the data processing device including a first internal circuit which receives power via the first internal power supply node from a main power supply, and a second internal circuit which receives power via the second internal power supply node from the main power supply or a subordinate power supply, second internal circuit including a memory, includes: detecting a reduction in a voltage level of the main power supply to a predetermined first detection level and a reduction in a voltage level of the main power supply to a predetermined second detection level lower than the first detection level; outputting a first detection signal when the reduction in a voltage level to the first detection level is detected, thereby causing the first internal circuit receiving power supplied from the first internal power supply node to stop operating and to inhibit access to the memory receiving power supplied from the second internal power supply node; outputting a second detection signal when the reduction in a voltage level to the second detection level is detected; connecting the main power supply to the first internal power supply node before the reduction in the voltage level to the first detection level is detected and disconnecting the main power supply from the first internal power supply node when the reduction in the voltage level to the first detection level is detected; connecting the main power supply to the second internal power supply node before the reduction in the voltage level to the second detection level is detected and disconnecting the main power supply from the second internal power supply node when the reduction in the voltage level to the second detection level is detected; and disconnecting the subordinate power supply from the second internal power supply node before the reduction in the voltage level to the second detection level is detected and connecting the subordinate power supply to the second internal power supply node when the reduction in the voltage level to the second detection level is detected.

According to the present invention, when the voltage level of the main power supply falls, the power supply is switched from the main power supply to the subordinate power supply, and the use of the subordinate power supply is minimized. As a result, the present invention can produce the effect of holding data with reliability when the voltage level of the power supply falls and the effect of improving the life of the subordinate power supply.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 4 is a timing chart showing a series of operations from a normal operation via a backup operation to a power-off operation in the microcomputer according to the first embodiment of the present invention;

DETAILED DESCRIPTION OF THE INVENTION

Further scope of applicability of the present invention will become apparent from the detailed description given hereinafter. However, it should be understood that the detailed description and specific examples, while indicating preferred embodiments of the invention, are given by way of illustration only, since various changes and modifications will become apparent to those skilled in the art from the detailed description.

First Embodiment

Figure 1:
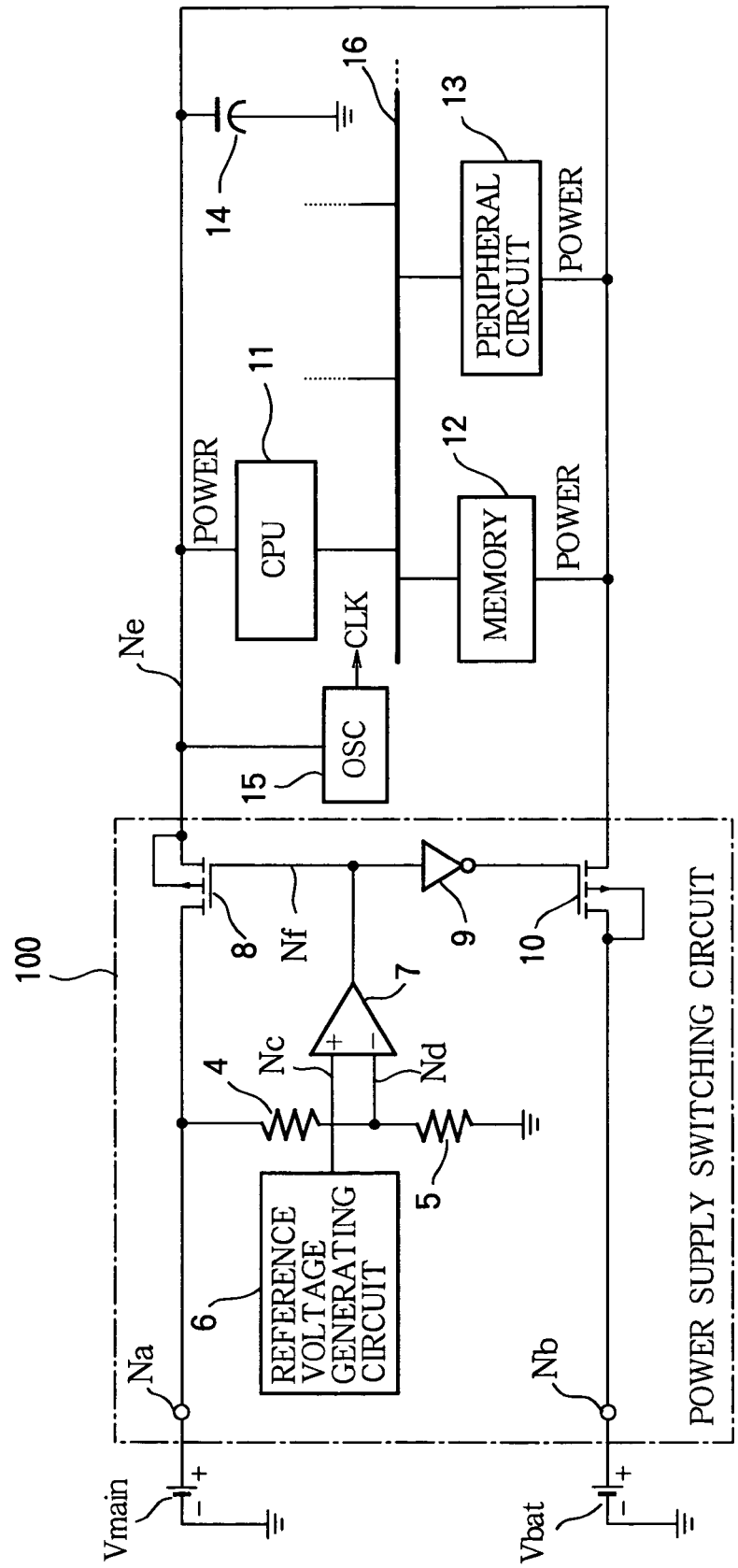
FIG. 1 is a diagram showing a circuit configuration of a conventional microcomputer.
Figure 2:
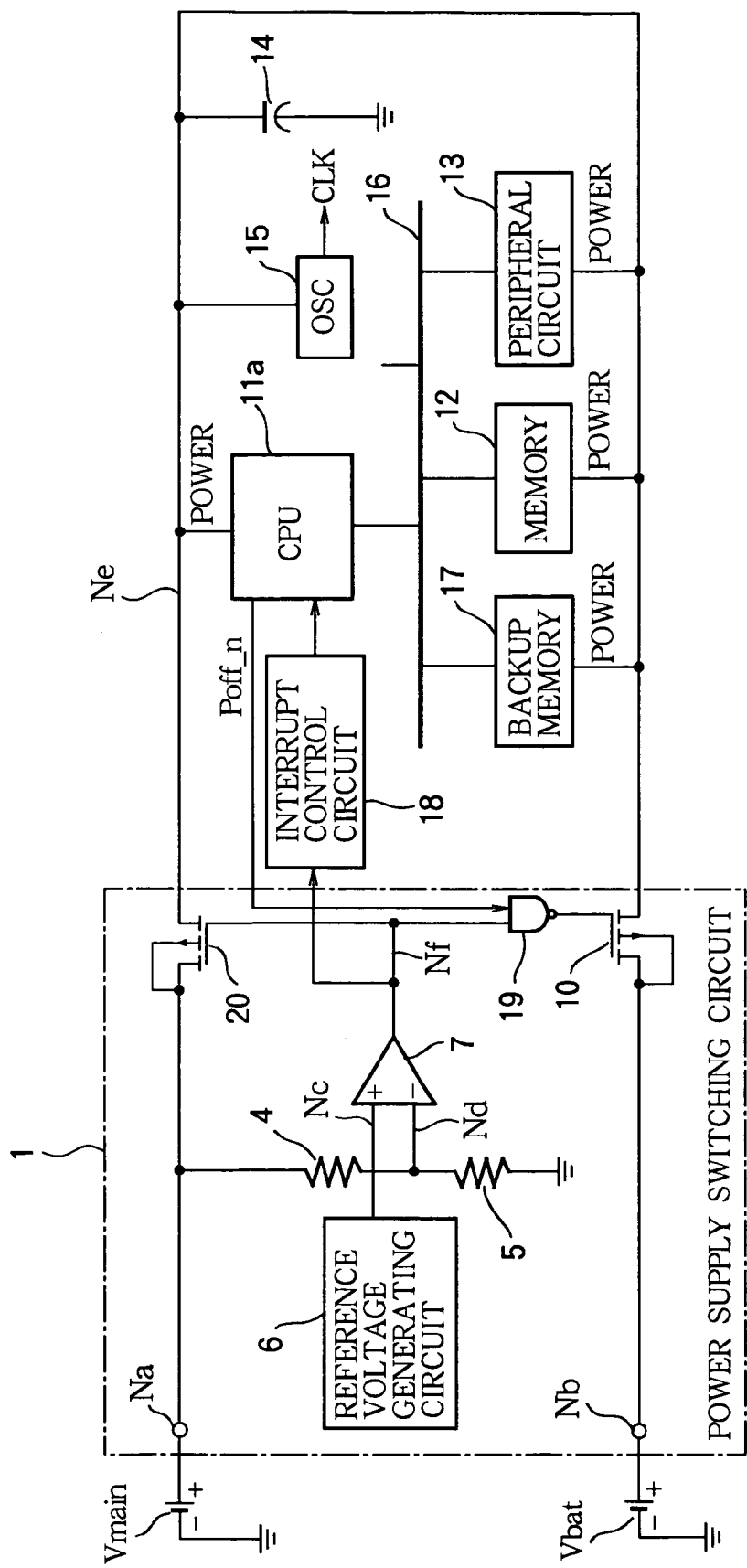
FIG. 2 is a diagram showing a circuit configuration of a microcomputer according to the first embodiment of the present invention.

FIG. 2 is a diagram showing a circuit configuration of a microcomputer according to the first embodiment of the present invention. The parts in FIG. 2 that are identical to or correspond to the parts in FIG. 1 are assigned identical reference characters. The microcomputer according to the first embodiment is a system including a plurality of power supplies.

Referring to FIG. 2, the microcomputer according to the first embodiment includes a main power supply Vmain, a subordinate power supply Vbat, a power supply switching circuit 1, a CPU 11a, a memory 12, a peripheral circuit (i.e., a peripheral) 13, a bypass capacitor 14, an oscillation circuit (OSC) 15, a CPU bus 16, a backup memory 17, and an interrupt control circuit 18.

The microcomputer according to the first embodiment includes two power supply terminals of a main power supply terminal Na and a subordinate power supply terminal Nb. A main power supply Vmain is connected to the main power supply terminal Na, and a subordinate power supply Vbat is connected to the subordinate power supply terminal Nb.

A primary battery such as a dry battery or a secondary battery such as a lithium ion battery is employed as the main power supply Vmain. Further, since the subordinate power supply Vbat is a backup power supply, in many cases, a small-size button battery or the like is employed as the subordinate power supply Vbat.

A power supply switching circuit 1 includes voltage dividing resistors 4 and 5 which form a voltage dividing resistor circuit, a reference voltage generating circuit 6, a comparator 7, PMOS transistors 10 and 20, and a NAND circuit 19.

When the power supply switching circuit 1 detects a reduction in the voltage level of the main power supply Vmain to a predetermined voltage level, the power supply switching circuit 1 switches power supplied to the microcomputer according to the first embodiment from the main power supply Vmain to the subordinate power supply Vbat and backs up data in a nonvolatile backup memory 17. When the power supply switching circuit 1 completes this data backup, the power supply switching circuit 1 stops power supply from the subordinate power supply Vbat, thereby powering off the microcomputer.

The voltage dividing resistor 4 is disposed between the main power supply terminal Na and a node Nd, and the voltage dividing resistor 5 is disposed between the node Nd and the ground. The voltage dividing resistors 4 and 5 generate a voltage VNd (i.e., a divided voltage of the main power supply Vmain), into which the voltage of the main power supply Vmain is divided according to the resistances of the dividing resistors 4 and 5, at the node Nd.

The reference voltage generating circuit 6 generates a reference voltage VNc and outputs the reference voltage VNc to a node Nc.

The positive-phase input terminal, i.e., a plus input terminal (+) of the comparator 7 is connected to the node Nc. The negative-phase input terminal, i.e., a minus input terminal (−) of the comparator 7 is connected to the node Nd. The output terminal of the comparator 7 is connected to a node Nf. The comparator 7 compares the voltage level VNd of the node Nd (i.e., a divided voltage of the main power supply Vmain) with the voltage level VNc of the node Nc (i.e., a reference voltage supplied from the reference voltage generating circuit 6), and outputs the result of comparison to the node Nf, which is connected to the interrupt control circuit 18, the NAND circuit 19 and the gate electrode of a PMOS transistor 20. Hence, the comparator 7 controls the turning on/off of the PMOS transistor 20 by its output signal.

Figure 3A:
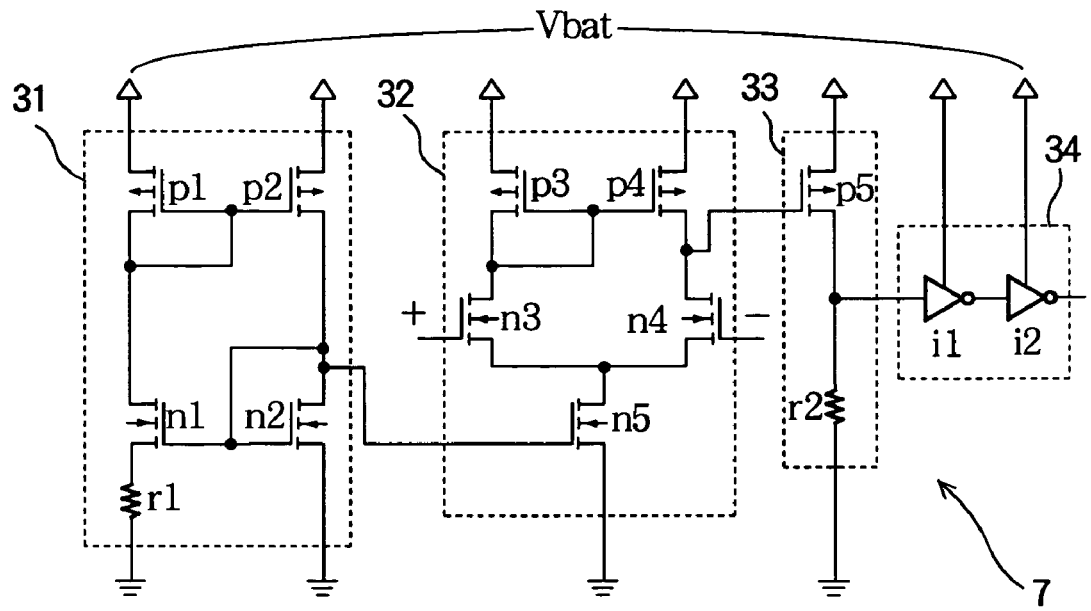
FIGS. 3A and 3B are circuit diagrams showing a circuit configuration of a comparator in the microcomputer according to the first embodiment of the present invention.
Figure 3B:
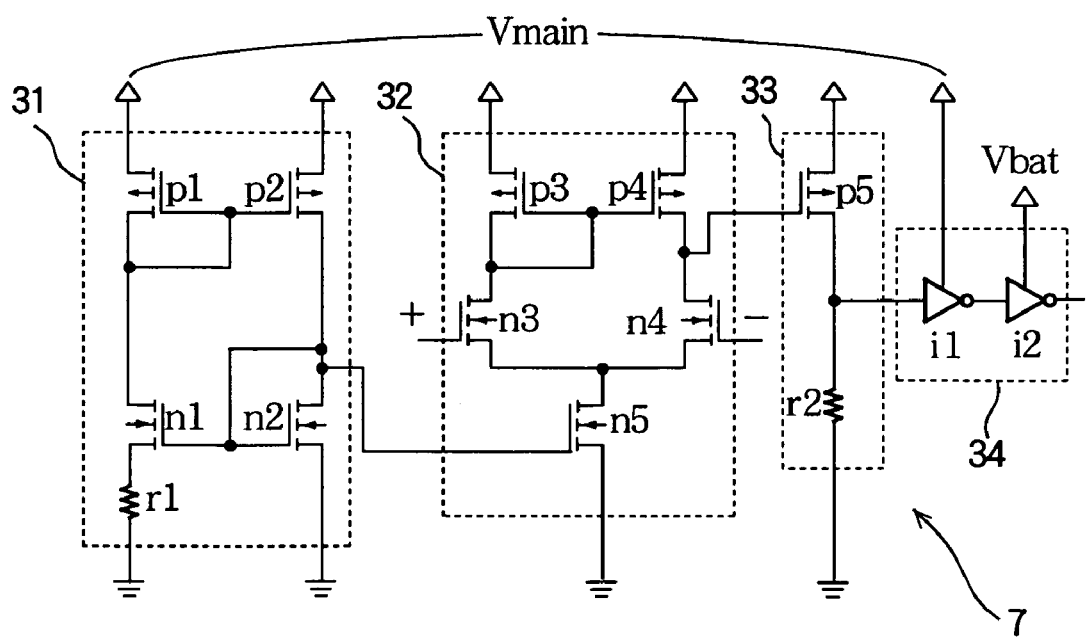

FIGS. 3A and 3B are circuit diagrams showing a circuit configuration of the comparator 7. In FIGS. 3A and 3B, the same parts are assigned identical reference characters.

Referring to FIGS. 3A and 3B, the comparator 7 includes a current source circuit 31, a differential input circuit 32, an amplifier circuit 33, and an output circuit 34.

Referring to FIGS. 3A and 3B, the current source circuit 31 includes PMOS transistors p1 and p2, NMOS transistors n1 and n2, and a resistor r1, and supplies a constant current to the differential input circuit 32.

Referring to FIGS. 3A and 3B, the differential input circuit 32 is a differential circuit including PMOS transistors p3 and p4 and NMOS transistors n3, n4 and n5. The differential input circuit 32 outputs a voltage corresponding to a difference between a reference voltage supplied from the reference voltage generating circuit 6 through the node Nc to the plus input terminal (+) and the divided voltage of the main power supply Vmain supplied from the node Nd to the minus input terminal (−), to the amplifier circuit 33.

Referring to FIGS. 3A and 3B, the amplifier circuit 33 includes a PMOS transistors p5 and a resistor r2. The amplifier circuit 33 reversely amplifies the output voltage of the differential circuit 32 and outputs the amplified voltage to the output circuit (i.e., output buffer) 34.

Referring to FIGS. 3A and 3B, the output circuit 34 includes two CMOS inverters i1 and i2. The output circuit 34 outputs "H" level or "L" level according to the output voltage of the differential input circuit 32, which is input via the amplifier circuit 33.

The comparator 7 shown in FIG. 3A or 3B is constructed as follows.

When the divided voltage VNd of the main power supply Vmain (i.e., the voltage level VNd of the node Nd) is higher than the reference voltage VNc (i.e., the voltage level VNc of the node Nc), that is, when a conditional expression VNd>VNc is satisfied, the output circuit 34 outputs "L" level as the result of comparison of both voltage levels.

When the divided voltage VNd of the main power supply Vmain (i.e., the voltage level VNd of the node Nd) is not higher than the reference voltage VNc (i.e., the voltage level VNc of the node Nc), that is, when a conditional expression VNd≦VNc is satisfied, the output circuit 34 outputs "H" level as the result of comparison of both voltage levels.

In the comparator 7 shown in FIG. 3A, all of the power supply terminals of the current source circuit 31, the differential input circuit 32, the amplifier circuit 33, and the output circuit 34 are connected to the subordinate power supply terminal Nb, and power is supplied from the subordinate power supply Vbat to all these circuits.

Meanwhile, in the comparator 7 shown in FIG. 3B, only the power supply terminal of the CMOS inverter i2 at the second stage of the output circuit 34 is connected to the subordinate power supply terminal Nb, power from the subordinate power supply Vbat is supplied only to the CMOS inverter i2 at the second stage. The power supply terminals of the current source circuit 31, the differential input circuit 32, the amplifier circuit 33, and the CMOS inverter i1 at the first stage of the output circuit 34 are connected to the main power supply terminal Na, and hence power from the main power supply Vmain is supplied to these circuits.

Referring to FIG. 2, the PMOS transistor 20 is disposed between the main power supply terminal Na and the internal power supply node Ne, and a gate electrode of the PMOS transistor 20 is connected to the node Nf. The substrate of a PMOS transistor 8 In the above-mentioned conventional power supply switching circuit 100 shown in FIG. 1 is connected to the internal power supply node Ne, whereas in the power supply switching circuit 1 according to the first embodiment, a substrate of the PMOS transistor 20 is connected to the main power supply terminal Na.

The NAND circuit 19 receives power supplied from the internal power supply node Ne (i.e., a power supply terminal of the NAND circuit 19 is connected to the internal power supply node Ne). Referring to FIG. 2, a first input terminal of the NAND circuit 19 is connected to the node Nf (i.e., the output terminal of the comparator 7) and a second input terminal of the NAND circuit 19 receives a power-off signal Poff_n from the CPU 11a, and the output terminal of the NAND circuit 19 is connected to the gate electrode of the PMOS transistor 10. The NAND circuit 19 generates a NAND signal (i.e., non-conjunction) of the output signal of the comparator 7 and the power-off signal Poff_n, and controls the turning on/off of the PMOS transistor 10 by the NAND signal.

Referring to FIG. 2, the PMOS transistor 10 is disposed between the subordinate power supply terminal Nb and the internal power supply node Ne, and the gate electrode of the PMOS transistor 10 is connected to the output terminal of the NAND circuit 19.

In this manner, the power supply switching circuit 1 according to the first embodiment shown in FIG. 2 is different from the above-mentioned conventional power supply switching circuit 100 shown in FIG. 1 in the respects that the inverter 9 shown in FIG. 1 is replaced with the NAND gate 19 shown in FIG. 2, and the PMOS transistor 8 having its substrate connected to the internal power supply node Ne is replaced with the PMOS transistor 20 having its substrate connected to the main power supply terminal Na.

The CPU 11a receives power supplied from the internal power supply node Ne (i.e., includes a power supply terminal connected to the internal power supply node Ne), is connected to the CPU bus 16, and controls the operation of the microcomputer according to the first embodiment. Moreover, when the power supply switching circuit 1 according to the first embodiment receives an interrupt request from an interrupt control circuit 18, the data processing circuit performs the interrupt processing of backing up the data of a register in the CPU 11a and the data of the memory 12 in the backup memory 17, and subsequently outputs the power off signal Poff_n to the NAND circuit 19 in the power supply switching circuit 1.

The memory 12 is a volatile semiconductor memory such as an SRAM. The memory 12 receives power supplied from the internal power supply node Ne, i.e., has a power supply terminal connected to the internal power supply node Ne. The memory 12 has data and address input/output interface connected to the CPU bus 16. The memory 12 is controlled by the CPU 11a, and stores data used by the CPU 11a and other data.

The peripheral circuit 13 receives power supplied from the internal power supply node Ne, i.e., has a power supply terminal connected to the internal power supply node Ne. The peripheral circuit 13 has data and address input/output interface connected to the CPU bus 16. The operation of the peripheral circuit 13 is controlled by the CPU 11a.

The bypass capacitor 14 is disposed between the internal power supply node Ne and the ground power supply, and eliminates power supply noises.

The oscillation circuit 15 receives power supplied from the internal power supply node Ne, i.e., has a power supply terminal connected to the internal power supply node Ne. The oscillation circuit 15 generates a clock signal CLK and outputs the clock signal CLK to the CPU 11a, the memory 12, the peripheral circuit 13, the backup memory 17, and the interrupt control circuit 18.

The CPU bus 16 connects among the CPU 11a, the memory 12, the peripheral circuit 13, and the backup memory 17.

The backup memory 17 receives power supplied from the internal power supply node Ne, i.e., has a power supply terminal connected to the internal power supply node Ne. The backup memory 17 has a data and address input/output interface connected to the CPU bus 16. The operation of the backup memory 17 is controlled by the CPU 11a. The backup memory 17 is a nonvolatile semiconductor memory such as an FeRAM and an EEPROM, i.e., a memory capable of holding stored data even when power is not supplied to the memory. The backup memory 17 is used for backing-up and storing the data of the register in the CPU 11a and the data of the memory 12.

The interrupt control circuit 18 has a power supply terminal (not shown) connected to a power supply node, an input terminal connected to the node Nf (i.e., the output terminal of the comparator 7), and an output terminal connected to the CPU 11a. The interrupt control circuit 18 outputs an interrupt request signal to the CPU 11a according to the output of the comparator 7.

In this manner, the microcomputer according to the first embodiment shown in FIG. 2 is different from the above-mentioned conventional microcomputer shown in FIG. 1 in the following respects.

First, the microcomputer according to the first embodiment includes the backup memory 17 and the interrupt control circuit 18. Second, the power supply switching circuit 100 shown in FIG. 1 is replaced with the power supply switching circuit 1 shown in FIG. 2. In the power supply switching circuit, the inverter 9 shown in FIG. 1 is replaced with the NAND gate 19 shown in FIG. 2; the output of the comparator 7 is input to the interrupt control circuit 18 and the NAND circuit 19; a power off signal Poff_n is output from the CPU 11a to the NAND circuit 19; and the PMOS transistor 8 shown in FIG. 1 having a substrate connected to the internal power supply node Ne is replaced with the PMOS transistor 20 shown in FIG. 2 having a substrate connected to the main power supply terminal Na.

FIG. 4 is a timing chart showing a series of operations from a normal operation via a backup operation to a power-off operation in the microcomputer according to the first embodiment.

In the microcomputer according to the first embodiment, as is the case with the above-mentioned conventional microcomputer shown in FIG. 1, the comparator 7 of the power supply switching circuit 1 compares the divided voltage VNd of the main power supply Vmain (i.e., the voltage level VNd of the node Nd) with the reference voltage VNc supplied from the reference voltage generating circuit 6 (i.e., the voltage level VNc of the node Nc), and the power supply is switched according to the result of the comparison.

In other words, usually, the PMOS transistor 20 is closed (i.e., turned on) and the PMOS transistor 10 is opened (i.e., turned off), and hence the main power supply Vmain is supplied to the internal power supply node Ne via the PMOS transistor 20 to operate the microcomputer by the main power supply Vmain. However, when a reduction in the voltage level of the main power supply Vmain to the predetermined voltage level is detected, the PMOS transistor 20 is turned off and the PMOS transistor 10 is turned on to supply the subordinate power supply Vbat via the PMOS transistor 10 to the internal power supply node Ne.

Referring to 4, in a normal operation period T02 until a time t2, the voltage level of the main power supply Vmain is within a range in which the operation of the microcomputer according to the first embodiment is guaranteed. In the normal operation period T02, a voltage level VNd of the node Nd is higher than a voltage level VNc of the node Nc. Therefore, an output voltage level of the comparator 7 (i.e., a voltage level VNf of the node Nf) is "L" level.

Then, when the voltage level VNf of the node Nf is "L" level, the PMOS transistor 20 is closed (i.e., turned on), the output voltage level of the NAND gate 19 is "H" level, and hence the PMOS transistor 10 is opened (i.e., turned off).

Therefore, the internal power supply node Ne receives power supplied from the main power supply Vmain via the main power supply terminal Na and the PMOS transistor 20, and power supply from the subordinate power supply Vbat is stopped. Hence, the internal circuit including the CPU 11a, the memory 12, and other circuit operates by power supplied from the main power supply Vmain.

Next, when the voltage level of the main power supply Vmain gradually decreases after a time t1 in the normal operation period T02 and in the course of time, the voltage level VNd of the node Nd becomes not higher than the voltage level VNc of the node Nc, i.e., a conditional; expression VNd≦VNc is satisfied at a time t2. In other words, when the voltage level of the main power supply Vmain becomes the detection level of the comparator 7, the comparator 7 detects a reduction in the voltage level of the main power supply Vmain and the output of the comparator 7 (i.e., the voltage level VNf of the node Nf) is inverted from "L" level to "H" level.

When the output of the comparator 7 becomes "H" level, the PMOS transistor 20 is turned off. Then, at this time, since the power-off signal Poff_n input from the CPU 11a to the NAND gate 19 is "H" level, when the voltage level VNf of the node Nf is brought to "H" level, the output voltage level of the NAND gate 19 is brought to "L" level to turn on the PMOS transistor 10.

Therefore, the internal power supply node Ne receives power from the subordinate power supply Vbat supplied from the subordinate power supply terminal Nb via the PMOS transistor 10, and power supply from the main power supply Vmain stops. Hence, power supplied to the CPU 11a, the memory 12, the peripheral circuit 13, the oscillation circuit 15, and the interrupt control circuit 18 is switched from the main power supply Vmain to the subordinate power supply Vbat, i.e., a backup operation period T23 starts.

Then, when the voltage level VNf of the node Nf is changed from "L" level to "H" level at a time t2, the interrupt control circuit 18 takes a rising edge of the voltage level VNf of the node Nf and sends an interrupt request signal (i.e., a pulse signal of "H" level) to the CPU 11a. Then, the CPU 11a receives an interrupt request from the interrupt control circuit 18 and performs the interrupt processing which is a data backup operation.

The interrupt processing of the data backup operation is to record the data of the register in the CPU 11a and the data of the memory 12 in the backup memory 17. At this time, a specific code for determining that the microcomputer is powered off along with the backup operation is written in a specific address of the backup memory 17.

Then, when the backup of the data and specific code is finished at a time t3 in the internal power-off period T3, the CPU 11a changes the power-off signal Poff_n from "H" level to "L" level.

When the power-off signal Poff_n is changed to "L" level, the output voltage level of the NAND circuit 19 is changed from "L" level to "H" level and hence the PMOS transistor 10 is turned off.

In this manner, the power supply from both the subordinate power supply Vbat and the main power supply Vmain to the internal power supply node Ne of the microcomputer according to the first embodiment stops, whereby the powering off of the CPU 11a, the memory 12, the peripheral circuit 13, the oscillation circuit 15, and the interrupt control circuit 18 is finished and an internal power-off period T3 starts.

When the main power supply Vmain of the microcomputer according to the first embodiment is again turned on, the voltage level VNd of the node Nd becomes higher than the voltage level VNc of the node Nc again (i.e., VNd≦VNc). Hence, the output voltage level of the comparator 7 (i.e., the voltage level VNf of the node Nf) is changed to "L" level to again turn on the PMOS transistor 20, whereby the main power supply Vmain is supplied to the internal power supply node Ne.

Then, the CPU 11a is reset, thereby being returned to the initial operation, and reads data backed up before the microcomputer is powered off from the backup memory 17 and again sets the data in the register in the CPU 11a and the memory 12. After this initial operation, the microcomputer according to the first embodiment is returned to the state before being powered off.

The CPU 11a reads the code recorded in the specific address of the backup memory 17 at the beginning of the initial operation. Then, the CPU 11a can determine whether or not the operation of backing up data is performed before the microcomputer is powered off by determining whether or not the read code is the specific code recorded at the time of performing the backup operation. Then, only when the operation of backing up the data is performed before the microcomputer is powered off, backup data is read from the backup memory 17 in the initial operation, whereas when the operation of backing up the data is not performed before the microcomputer is powered off, the backup data is not read from the backup memory 17.

In the comparator 7 shown in FIG. 3A, the power supply terminals of the current source circuit 31, the differential input circuit 32, the amplifier circuit 33, and the output circuit 34 are connected to the subordinate power supply terminal Nb. In this manner, by supplying power not from the main power supply Vmain, a reduction in the voltage level of which is detected, but from the subordinate power supply Vbat directly to the comparator 7, it is possible to operate the comparator 7 with reliability even when the voltage level of the main power supply Vmain falls or even when power supply from the main power supply Vmain is stopped.

As described above, in the first embodiment, even when the voltage level of the main power supply Vmain falls in the backup operation period T23, it is possible to keep the voltage level VNf of the node Nf at "H" level and to perform the interrupt data backup with reliability.

Moreover, in the first embodiment, the power supply terminal of the NAND circuit 19 is also connected to the subordinate power supply terminal Nb. In this manner, by supplying power not from the main power supply Vmain, a reduction in the voltage level of which is detected, but from the subordinate power supply Vbat directly to the NAND circuit 19, it is possible to operate the NAND circuit 19 with reliability even when the voltage level of the main power supply Vmain falls or even when power supply from the main power supply Vmain is stopped.

Furthermore, in the above-mentioned conventional microcomputer shown in FIG. 1, the substrate of the PMOS transistor 8 is connected to the internal power supply node Ne and hence even when the PMOS transistor 8 is turned off, the connection of the PMOS transistor 8 becomes forward diode and the main power supply Vmain is not completely disconnected from the inner power supply node Ne. However, in the microcomputer according to the first embodiment shown in FIG. 2, the substrate of the PMOS transistor 20 is connected to the main power supply terminal Na and the connection of the PMOS transistor 20 becomes backward diode, so that when the PMOS transistor 20 is turned off, the main power supply Vmain can be completely disconnected from the internal power supply node Ne.

In this manner, in the internal power-off period T3, the voltage levels of the gate electrodes of the PMOS transistors 20 and 10 are kept at "H" level to disconnect the internal power supply node Ne from the main power supply Vmain and the subordinate power supply Vbat with reliability, whereby the complete powering off of the microcomputer can be realized.

Generally, the current consumption of the microcomputer is from several tens microamperes (μA) to several miliamperes (mA) and the current consumption of the comparator is approximately from 1 μA to 2 μA. Therefore, the comparator 7 shown in FIG. 3A consumes current steadily from the subordinate power supply Vbat although its current consumption is smaller as compared with the current consumption of the whole of the microcomputer.

In the comparator 7 shown in FIG. 3A, it is the current source circuit 31, the differential input circuit 32, and the amplifier circuit 33 that steadily consume current, and the current value of steady state current depends on the resistance of the resistor r1 of the current source circuit 31 and the resistance of the resistor r2 of the amplifier circuit 33. However, since the output circuit 34 includes the CMOS inverters i1 and i2, the output circuit 34 does not flow steady state current. Then, since the NAND circuit 19 is basically including a CMOS inverter, the NAND circuit 19 does not flow steady state current as is the case with the output circuit 34 of the comparator 7.

Then, in the comparator 7 shown in FIG. 3B, to reduce current consumption from the subordinate power supply Vbat, only the power supply terminal of the inverter i2 at the second stage of the output circuit 34 is connected to the subordinate power supply terminal Nb, and the power supply terminals of the other current source circuit 31, the differential input circuit 32, the amplifier circuit 33, and the inverter i1 at the first stage of the output circuit 34 are connected to the main power supply terminal Na. The comparator 7 shown in FIG. 3B does not consume steady state current from the subordinate power supply Vbat. Therefore, in the comparator 7 shown in FIG. 3B, current consumption from the subordinate power supply Vbat can be reduced further than in the comparator 7 shown in FIG. 3A.

When the voltage of the main power supply Vmain falls and the power is not supplied from the main power supply Vmain in the comparator 7 shown in FIG. 3B, the inverter i2 at the second stage of the output circuit 34 needs to output a voltage of "H" level. However, when the voltage of the main power supply falls and the power is not supplied from the main power supply Vmain, the output of the inverter i1 at the first stage of the output circuit 34 is brought to "L" level smaller than the input threshold of the inverter i2 at the second stage, so that the comparator 7 shown in FIG. 3B can satisfy the requirements.

Moreover, in order that the voltage level of the subordinate power supply Vbat is equal to the voltage level of the main power supply Vmain brought to the low level in the comparator 7 shown in FIG. 3B, a level converting circuit including a MOS transistor may be provided at the input stage of the inverter i2 at the second stage. The level converting circuit including the MOS transistor does not flow steady state current like the CMOS converter and hence can reduce the consumption of the subordinate power supply Vbat even if the level converting circuit is provided.

Furthermore, the power supply switching circuit 1 may employ a construction in which the voltage level of the main power supply Vmain is not monitored at all times but is monitored at regular intervals by the comparator 7. In this case, it is possible to turn off the comparator 7 during a period over which the voltage level of the main power supply Vmain is not monitored and hence to reduce the consumption of the subordinate power supply Vbat.

As described above, according to the first embodiment, when a reduction in the voltage level of the main power supply Vmain is detected, the power supply is switched from the main power supply Vmain to the subordinate power supply Vbat and the interrupt data backup is generated to backup (i.e., save) data in the nonvolatile memory by the use of the subordinate power supply Vbat. When the saving of the data is finished, power supply from the subordinate power supply Vbat is also stops. In other words, when the voltage level of the main power supply Vmain falls, the whole system is not operated for a long time by the subordinate power supply Vbat but the subordinate power supply Vbat is used only during the backup operation period T23 over which the data is backed up (i.e., saved), thereby reducing the use of the subordinate power supply Vbat to a necessary minimum amount. Therefore, when the voltage level of the main power supply Vmain falls below the predetermined voltage level, the data can be held with reliability and the life of the subordinate power supply Vbat can be improved.

To reduce power consumption simply is achieved to some extent by stopping all dynamic signals such as a clock signal CLK of the internal circuit of the microcomputer. However, each of the transistors constructing the internal circuit has a small leak current even in a static state, so that when the scale of the internal circuit is large, the leak current cannot be neglected. According to the first embodiment, when the backup processing is finished, the power supply terminal is completely disconnected from the internal circuit to stop supplying power, so that power consumption can be reduced further than a case where dynamic signals are stopped.

Second Embodiment

Figure 5:
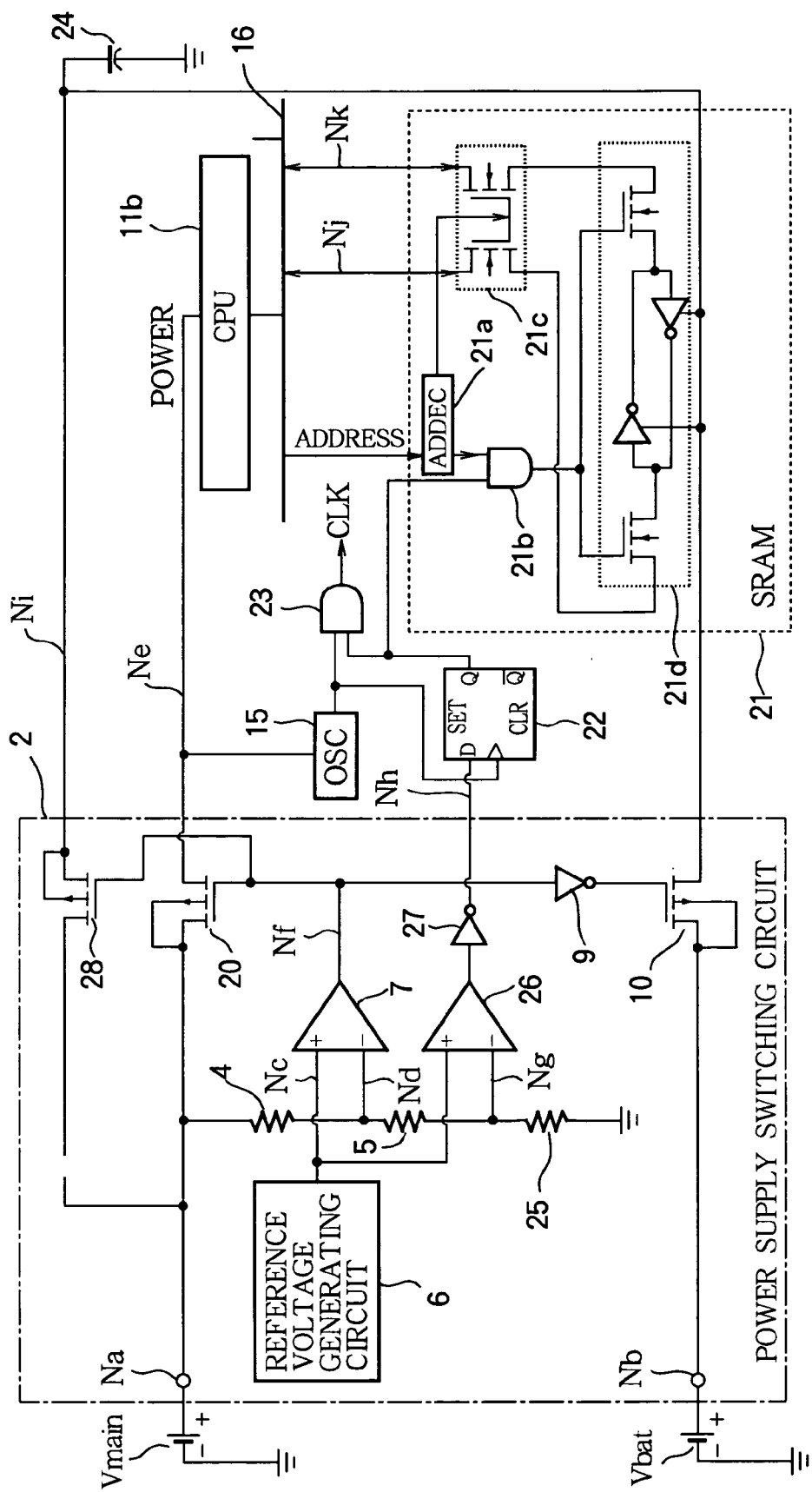
FIG. 5 is a diagram showing a circuit configuration of a microcomputer according to the second embodiment of the present invention.

FIG. 5 is a diagram showing a circuit configuration of a microcomputer according to the second embodiment of the present invention. The parts in FIG. 5 that are identical to or correspond to the parts in FIG. 2 or 1 are assigned identical reference characters. The microcomputer according to the second embodiment also has a plurality of power supplies in the same manner as the microcomputer according to the first embodiment.

Referring to FIG. 5, the microcomputer according to the second embodiment includes a power supply switching circuit 2, a main power supply Vmain, a subordinate power supply Vbat, a CPU 11b, an SRAM 21, an oscillation circuit (OSC) 15, a CPU bus 16, a D-type flip-flop 22, an AND circuit 23, and a bypass capacitor 24. Although the microcomputer according to the second embodiment includes a peripheral circuit 13 connected to the CPU bus 16 and a bypass capacitor 14 connected to the internal power supply node Ne in the same manner as the microcomputer according to the first embodiment shown in FIG. 2, the peripheral circuit 13 and the bypass capacitor 14 are not shown in FIG. 5.

The power supply switching circuit 2 includes voltage dividing resistors 4, 5 and 25 which forms a voltage dividing resistor circuit. The power supply switching circuit 2 also includes a reference voltage generating circuit 6, comparators 7 and 26, PMOS transistors 10, 20 and 28, and inverters 9 and 27.

When the power supply switching circuit 2 detects a reduction in the voltage level of the main power supply Vmain to a predetermined first voltage level, the power supply switching circuit 2 stops supplying a clock to stop the operation of the internal circuit such as the CPU 11b and inhibit the access of the SRAM 21. Further, when the power supply switching circuit 2 detects a more reduction in the voltage level of the main power supply Vmain to a predetermined second voltage level, which is lower than the first voltage level, the power supply switching circuit 2 stops supplying power to the internal circuit such as the CPU 11b and switches a power supply for supplying power to the SRAM 21 from the main power supply Vmain to the subordinate power supply Vbat.

The voltage dividing resistor 4 is disposed between the main power supply terminal Na and a node Nd, the voltage dividing resistor 5 is disposed between the node Nd and a node Ng, and the voltage dividing resistor 25 is disposed between the node Ng and the ground. The voltage dividing resistors 4, 5 and 25 divide the voltage of the main power supply Vmain in the proportions of the series resistance of the dividing resistors 4 and 5 to the resistance of the dividing resistor 25, thereby generating a second divided voltage VNg of the main power supply Vmain at the node Ng. Further, the voltage dividing resistors 4, 5 and 25 divide the voltage of the main power supply Vmain in the proportions of the resistance of the dividing resistor 4 to the series resistance of the dividing resistors 5 and 25, thereby generating a first divided voltage VNd of the main power supply Vmain at the node Nd.

A positive-phase input terminal, i.e., a plus input terminal (+) of the comparator 7 is connected to the node Nc. A negative-phase input terminal, i.e., a minus input terminal (−) of the comparator 7 is connected to the node Nd. An output terminal of the comparator 7 is connected to a node Nf. The comparator 7 compares the voltage level VNd of the node Nd which is the first divided voltage VNd of the main power supply Vmain with the voltage level VNc of the node Nc which is the reference voltage supplied from the reference voltage generating circuit 6, and outputs the result of the comparison to the node Nf which is connected to the gate electrodes of PMOS transistors 20 and 28. Hence, the comparator 7 controls the turning on/off of the PMOS transistor 20 by its output signal.

A positive-phase input terminal, i.e, a plus input terminal (+) of the comparator 26 is connected to the node Nc. A negative-phase input terminal, i.e., a minus input terminal (−) of the comparator 26 is connected to the node Ng. An output terminal of the comparator 26 is connected to an input terminal of an inverter 27. The comparator 26 compares the voltage level VNg of the node Ng which is a second divided voltage VNg of the main power supply Vmain with the voltage level VNc of the node Nc which is a reference voltage from the reference voltage generating circuit 6, and outputs the result of the comparison to the inverter 27.

Except for the connection of the power supply terminal, each of the comparators 7 and 26 in the second embodiment has the same construction as the comparator 7 shown in FIG. 3A in the first embodiment. In the second embodiment, all of the power supply terminals of the current source circuit 31 of the comparators 7 and 26, the differential input circuit 32, the amplifier circuit 33, and the output circuit 34 are not connected to the subordinate power supply Vbat, i.e., the subordinate power supply terminal Nb, but are connected to a second internal power supply node Ni.

In the second embodiment, the first divided voltage VNd of the main power supply Vmain (i.e., the voltage level VNd of the node Nd) corresponds to the divided voltage for detecting a reduction in the voltage level of the main power supply in the first embodiment (i.e., the voltage level VNd of the node Nd). The second divided voltage VNg of the main power supply Vmain (i.e., the voltage level VNg of the node Ng) is lower than the first divided voltage VNd and the divided voltage level of the first embodiment. Therefore, the comparator 26 can detect a smaller reduction in the voltage level of the main power supply Vmain than the comparator 7. Therefore, when the voltage level of the main power supply Vmain falls, the comparator 26 detects a reduction in the voltage level of the main power supply Vmain before the comparator 7 detects a reduction in the voltage level of the main power supply Vmain.

The inverter 9 receives power supplied from the first internal power supply node Ne, i.e., a power supply terminal of the inverter 9 is connected to the first internal power supply node Ne. An input terminal of the inverter 9 is connected to the node Nf which is connected to an output terminal of the comparator 7. An output terminal of the inverter 9 is connected to the gate electrode of the PMOS transistor 10. The inverter 9 inverts the output signal of the comparator 7 to output the inverted signal to the gate electrode of the PMOS transistor 10, and controls the turning on/off of the PMOS transistor 10 by the inverted signal.

The inverter 27 receives power supplied from the first internal power supply node Ne, i.e., a power supply terminal of the inverter 27 is connected to the first internal power supply node Ne. An input terminal of the inverter 27 is connected to the output terminal of the comparator 26. An output terminal of the inverter 27 is connected to a node Nh which is connected to a data input terminal D of the flip-flop 22. The inverter 27 inverts the output signal of the comparator 26 and outputs the inverted signal to the data input terminal D of the flip-flop 22.

The PMOS transistor 28 is disposed between the main power supply terminal Na and an internal power supply node Ni. The gate electrode of the PMOS transistor 28 is connected to the node Nf, which is connected to the gate electrode of the PMOS transistor 20.

In the power supply switching circuit 2 according to the second embodiment, the substrate of the PMOS transistor 20 is connected to the main power supply terminal Na, whereas the substrate of the PMOS transistor 28 is connected to the internal power supply node Ni as is the case with the PMOS transistor 8 of above-mentioned conventional the power supply switching circuit 100 shown in FIG. 1.

In this manner, the power supply switching circuit 2 of the second embodiment shown in FIG. 5 is different from the above-mentioned conventional power supply switching circuit 100 shown in FIG. 1 in the respects that the power supply switching circuit 2 of the second embodiment includes the voltage dividing resistor 25, the comparator 26, the inverter 27, and the PMOS transistor 28 in addition to the constructions of the above-mentioned conventional power supply switching circuit 100, and the PMOS transistor 8 in the conventional power supply switching circuit 100 including the substrate connected to the internal power supply node Ne is replaced with the PMOS transistor 20 in the power supply switching circuit 2 including the substrate connected to the main power supply terminal Na.

Then, in the power supply switching circuit 2 according to the second embodiment, by providing the PMOSs 20 and 28, the supply path of the main power supply Vmain (i.e., a power supply node to supply the main power supply Vmain) is divided into two paths, i.e., there are provided an internal power supply node (i.e., a first internal power supply node) Ne to which the main power supply Vmain is supplied via the PMOS transistor 20 and an internal power supply node (i.e., as a second internal power supply node) Ni to which the main power supply Vmain is supplied via the PMOS transistor 28.

The CPU 11b receives power supplied from the first internal power supply node Ne, i.e., a power terminal of the CPU 11b is connected to the first internal power supply node Ne. The CPU 11b is connected to the CPU bus 16 and controls the operation of the microcomputer according to the second embodiment. However, the CPU 11b of the second embodiment is different from the CPU 11a of the first embodiment in the respects that the CPU 11b does not perform the interrupt processing for data backup and does not output the power-off signal Poff_n.

Referring to FIG. 5, the SRAM 21 includes an address decoder (ADDEC) 21a, an AND circuit 21b, a bit line switch 21c, and an SRAM cell 21d. The SRAM 21 includes a plurality of SRAM cells 21d, the number of which corresponds to the number of storage bits of the SRAM 21, a plurality of AND circuits 21b, the number of which corresponds to the number of a plurality of word addresses, and a plurality of bit line switches 21c, the number of which corresponds to the number of a plurality of bits constructing one word (i.e., the number of data buses of the CPU bus 16). However, for the sake of clarity, only one bit of the SRAM cell is shown in FIG. 5.

The address decoder 21a receives power supplied from the first internal power supply node Ne, i.e., a power supply terminal of the address decoder 21a is connected to the first internal power supply node Ne. The address decoder 21a decodes an address data ADDRES input from an address bus of the CPU bus 16, outputs a cell selecting signal (i.e., a word line selecting signal) to the AND circuit 21b according to the decoded signal, and outputs a bit line selecting signal (i.e., a chip selecting signal) to the gate electrode of a switch MOS transistor of the bit line switch 21c. Therefore, the address decoder 21a controls the turning on/off of the switch MOS transistor by the bit line selecting signal.

The AND circuit 21b receives power supplied from the first internal power supply node Ne, i.e., a power supply terminal of the AND circuit 21b is connected to the first internal power supply node Ne. A cell selecting signal supplied from the address decoder 21a is input to the first input terminal of the AND circuit 21b. The output signal supplied from the data output terminal Q of the flip-flop 22 is input to the second input terminal of the AND circuit 21b. The output terminal of the AND circuit 21b is connected to the gate electrode of the cell switch MOS transistor of the SRAM 21d. The AND circuit 21b generates a logical product signal obtained by the logical AND of the cell selecting signal and the output signal of the data output terminal Q of the flip-flop 22, and controls the turning on/off of the cell switch MOS transistor on the basis of the logical product signal.

The bit line switch 21c includes two switch MOS transistors. These switch MOS transistors are disposed between the nodes Nj and Nk, which are connected to the data bus of the CPU 16 respectively, and the bit line, respectively. The bit line selecting signals from the address decoder 21a are input to the gates of the switch MOS transistors.

The SRAM cell 21d includes two inverters receiving power supplied from the second internal power supply node Ni (i.e., the power supply terminals of the inverters are connected to the second internal power supply node Ni) and two cell switch MOS transistors. The SRAM cell 21d stores data of one bit, which is input from the data bus of the CPU bus 16 via the nodes Nj and Nk, the bit line switch 21c, the bit line, and the two cell switch MOS transistors, in a flip-flop including the two inverters (i.e., writes data) or outputs the data of one bit stored in this flip-flop to the data bus of the CPU 16 (i.e., reads data).

The flip-flop 22 receives power supplied from the first internal power supply node Ne, i.e., a power supply terminal of the flip-flop 22 is connected to the first internal power supply node Ne. The data input terminal D of the flip-flop 22 is connected to a node Nh, which is connected to an output terminal of the inverter 27 in the power supply switching circuit 2. The data output terminal Q of the flip-flop 22 is connected to an input terminal of the AND circuit 23 and an input terminal of the AND circuit 21 in the SRAM 21. A clock signal output from the oscillation circuit 15 is input to a clock input terminal of the flip-flop 22. The flip-flop 22 latches a reverse signal of the output signal of the comparator 26 in the power supply switching circuit 2 and outputs the reverse signal to the AND circuit 23 and the AND circuit 21b in the SRAM 21.

The AND circuit 23 receives power supplied from the first internal power supply node Ne, i.e., a power supply terminal of the AND circuit 23 is connected to the first internal power supply node Ne. A clock signal output from the oscillation circuit 15 is input to the first input terminal of the AND circuit 23, and the output signal of the data output terminal Q of the flip-flop 22 is input to the second input terminal of the AND circuit 23. The AND circuit 23 generates a logical AND signal of the clock signal from the oscillation circuit 15 and the output signal of the data output terminal Q of the flip-flop 22 as a clock signal CLK and outputs the clock signal CLK to the CPU 11b and the SRAM 21.

The first internal power supply node Ne, to which the voltage of the main power supply Vmain is supplied through the PMOS transistor 20, supplies power to almost all internal circuits including the CPU 11b, the oscillation circuit 15, the flip-flop 22, the AND circuit 23, the address decoder 21a, and the AND circuit 21b in the SRAM 21. In the second embodiment, the first internal power supply node Ne is not connected to the PMOS transistor 10, which is different from the first embodiment, and hence even when the PMOS transistor 10 is turned on, the first internal power supply node Ne is not connected to the subordinate power supply terminal Nb and hence does not receive power supplied from the subordinate power supply Vbat.

Meanwhile, the second internal power supply node Ni, to which the voltage of the main power supply Vmain is supplied through the PMOS transistor 28, supplies power only to (i.e., the inverter of) the SRAM cell 21d of the SRAM 21. The second internal power supply node Ni is connected to the PMOS transistor 10 as is the case with the internal power supply node Ne in the first embodiment. Hence, when the PMOS transistor 10 is turned on, the second internal power supply node Ni is connected to the subordinate power supply terminal Nb, thereby being supplied with power from the subordinate power supply Vbat.

In this manner, the microcomputer according to the second embodiment shown in FIG. 5 is different from the above-mentioned conventional microcomputer shown in FIG. 1 in the following respects. First, the microcomputer according to the second embodiment includes the D-type flip-flop 22, the AND circuit 22, and the bypass capacitor 24. Second, the memory 12 in the above-mentioned conventional microcomputer is replaced with the SRAM 21 in the microcomputer according to the second embodiment. Third, the power supply switching circuit 100 in the above-mentioned conventional microcomputer is replaced with the power supply switching circuit 2 in the microcomputer according to the second embodiment including the voltage dividing resistor 25, the comparator 26, the inverter 27, and the PMOS transistor 28. Fourth, the microcomputer according to the second embodiment includes two power supply paths of the first internal power supply node Ne for supplying the main power Vmain to almost all internal circuit except for the SRAM 21d by the PMOS transistor 20 and the second internal power supply node Ni for supplying the main power Vmain or the subordinate power Vbat only to the SRAM 21d by the PMOS transistor 28 or 10.

The backup memory 17 and the interrupt control circuit 18 provided in the microcomputer according to the first embodiment shown in FIG. 2 are not necessary in the microcomputer according to the second embodiment, and hence are not provided.

Figure 6:
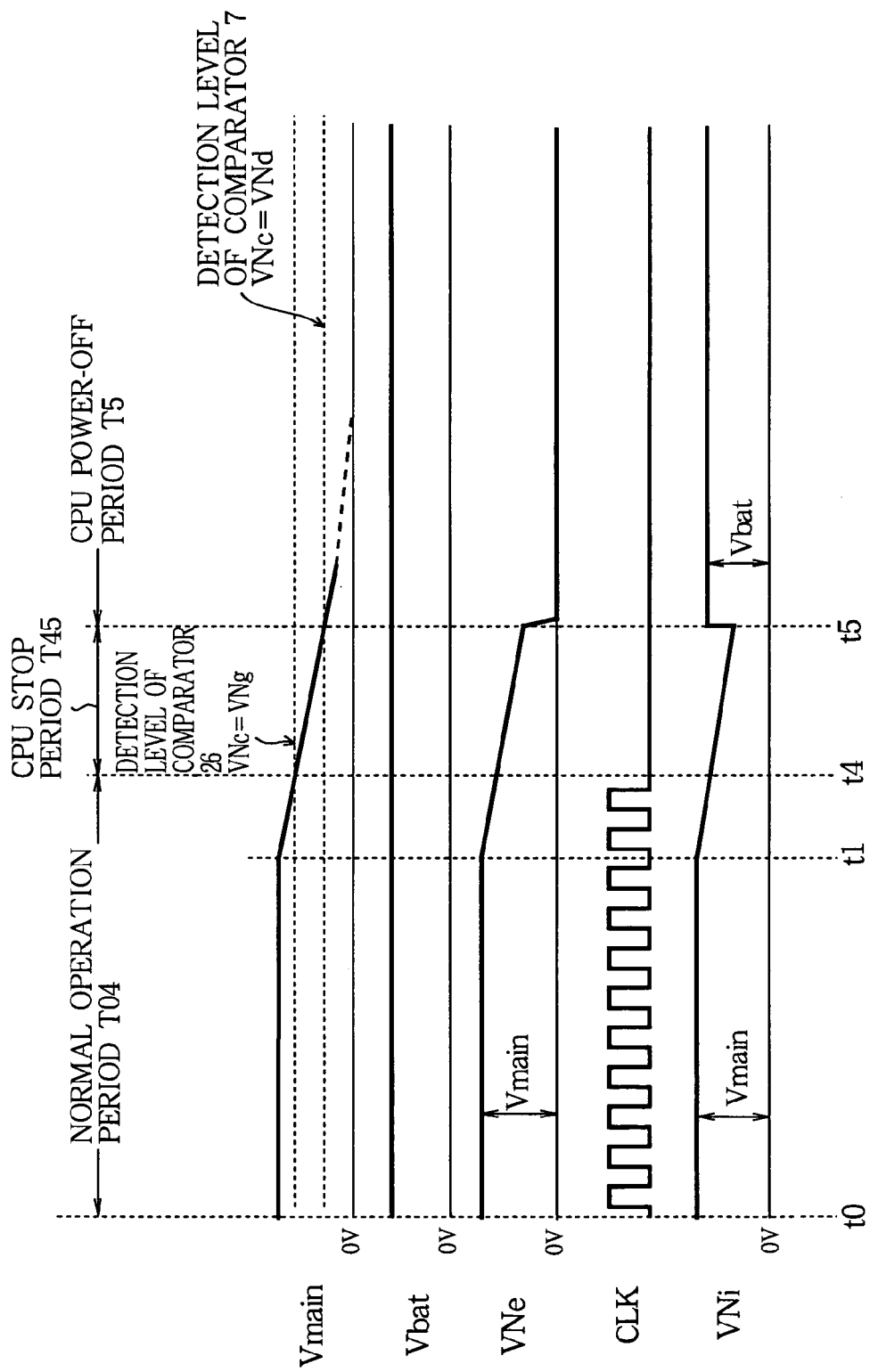
FIG. 6 is a timing chart showing a series of operations from a normal operation via a CPU stop operation to a CPU power-off operation in the microcomputer according to the second embodiment of the present invention.

FIG. 6 is a timing chart showing a series of operations from a normal operation via a CPU stop operation to a CPU power-off operation in the microcomputer according to the second embodiment.

Also in the microcomputer according to the second embodiment, as is the case with the above-mentioned conventional microcomputer, the comparator 7 of the power supply switching circuit 2 compares the first divided voltage VNd (i.e., the voltage level VNd of the node Nd) of the main power supply Vmain with the reference voltage (i.e., the voltage level VNc of the node Nc) from the reference voltage generating circuit 6, and the power supply is switched according to the result of the comparison.

Furthermore, in the microcomputer according to the second embodiment, the comparator 26 of the power supply switching circuit 2 compares the second divided voltage VNg (i.e., the voltage level VNg of the node Ng) of the main power supply Vmain with the reference voltage (i.e., the voltage level VNc of the node Nc), and the operation of the CPU 11b, i.e., operation of the microcomputer is stopped according to the result of the comparison.

When the voltage level of the main power supply terminal Na is higher than 0 volt, the voltage level VNd of the node Nd is higher than the voltage level VNg of the node Ng and hence when the voltage level of the main power supply Vmain falls, the operation of stopping the operation of the CPU is performed before the power supply is switched.

First, in a normal operation period T04 until a time t4, the voltage level of the main power supply Vmain is within a range in which the operation of the microcomputer according to the second embodiment is guaranteed and hence the voltage level VNg of the node Ng is higher than the voltage level VNc of the node Nc, i.e., Ng>Nc.

Hence the voltage level VNd of the node Nd is higher than the voltage level VNc of the node Nc, i.e., Nd>Nc.

Therefore, both of the output of the comparator 26 and the output of the comparator 7 (i.e., the voltage level VNf of the node Nf) are at "L" level.

Then, when the voltage level VNf of the node Nf is "L" level, the PMOS transistors 20 and 28 are turned on and the output of the inverter 9 is at "H" level, and hence the PMOS transistor 10 is turned off.

Therefore, the first internal power supply node Ne receives power supplied from the main power supply Vmain supplied from the main power supply terminal Na via the PMOS transistor 20, and the second internal power supply node Ni receives power supplied from the main power supply Vmain supplied from the main power supply terminal Na via the PMOS transistor 28, and power supply from the subordinate power supply Vbat is turned off.

Then, when the output of the comparator 26 is at "L" level, the output of the inverter 27 (i.e., the voltage level VNh of the node Nh) is at "H" level. Hence, a clock signal from the oscillation circuit 15 triggers the flip-flop 22 to latch the "H" level VNh of the node Nh and to output "H" level to the AND circuit 23 and the AND circuit 21b in the SRAM 21.

Therefore, the AND circuit 23 outputs the clock signal generated by the oscillation circuit 15 as the clock signal CLK and the AND circuit 21b in the SRAM 21 outputs a cell selecting signal input from the address decoder 21a to the gate electrode of the cell switch MOS transistor of the SRAM cell 21d.

In this manner, in the normal operation period T04, the main power supply Vmain is used as supply power and the clock signal generated by the oscillation circuit 15 is supplied as the clock signal CLK, whereby the CPU 11b, the SRAM 21 and the other internal circuit are operated.

Next, when the voltage level of the main power supply Vmain gradually decreases after a time t1 in the normal operation period T04 and in the course of time, the relationship that the voltage level VNc of the node Nc is not higher than the voltage level VNg of the node Ng holds at a time t4. In other words, when the voltage level of the main power supply Vmain becomes the detection level of the comparator 26 (i.e., first detection level), the comparator 26 detects a reduction in the voltage level of the main power supply Vmain and the output of the comparator 26 is reversed from "L" level to "H" level and hence the output of the inverter 27 (i.e., the voltage level VNh of the node Nh) is also inverted from "H" level to "L" level. At this time, the inequality that the voltage level VNd of the node Nd is higher than the voltage level VNc of the node Nc is yet held unchanged and hence the output of the comparator 7 (i.e., the voltage level VNf of the node Nf) is held unchanged at "L" level.

When the voltage level VNh of the node Nh is changed from "H" level to "L" level, a clock signal from the oscillation circuit 15 triggers the flip-flop 22 to latch the "L" level VNh of the node Nh and to output the "L" level to the AND circuit 23 and the AND circuit 21b in the SRAM 21.

With this, the AND circuit 23 fixes the clock signal CLK of its output at "L" level and stops supplying the clock signal. Hence, an operation clock is not supplied to the CPU 11b and hence the CPU 11b stops its operation, i.e., CPU operation stop period T45 starts and hence the microcomputer according to the second embodiment stops its operation.

Moreover, the AND circuit 21b in the SRAM 21 also fixes its output at "L" level and hence the switch NMOS transistor in the SRAM 21d is held turned off and cannot access the SRAM 21d.

However, the SRAM cell 21d of the SRAM 21 receives power supplied from the main power supply Vmain supplied from the second internal power supply node Ni via the PMOS transistor 28 and hence the data stored in the SRAM 21 is held.

In this manner, when the comparator 26 detects a reduction in the voltage level of the main power supply Vmain before the comparator 7 detects a reduction in the voltage level of the main power supply Vmain, supplying the clock signal from the AND circuit 23 is stopped to stop the operation of the microcomputer according to the second embodiment and to inhibit the access to the SRAM 21.

When the voltage level of the main power supply Vmain further decreases and in the course of time, the voltage level VNd of the node Nd becomes not higher than the voltage level VNc of the node Nc (i.e., VNd≦VNc) at a time t2. In other words, when the voltage level of he main power supply Vmain becomes the detection level of the comparator 7 (i.e., the second detection level), the comparator 7 detects a reduction in the voltage level of the main power supply Vmain and the output of the comparator 7 (i.e., the voltage level VNf of the node Nf) is inverted from "L" level to "H" level and the output of the inverter 9 is inverted from "H" level to "L" level. Therefore, the PMOS transistors 20 and 28 are turned off and the PMOS transistor 10 is turned on.

Since the PMOS transistors 20 and 28 are turned off, power is not supplied to the first internal power supply node Ne from any of the main power supply Vmain and the subordinate power supply Vbat. Hence, the CPU 11b, the oscillation circuit 15, the flip-flop 22, the AND circuit 23, and the address decoder 21a, the AND circuit 21b, and the bit line switch 21c in the SRAM 21 are powered off, i.e., a CPU powering-off period T5 starts.

However, since the PMOS transistor 10 is turned on, the second internal power supply node Ni has the subordinate power Vbat supplied from the subordinate power supply terminal Nb via the PMOS transistor 10 and power supply from the main power supply Vmain is turned off. Hence, the supply power to the SRAM cell 21d of the SRAM 21 is switched from the main power supply Vmain to the subordinate power supply Vbat by the second power supply switching circuit 2 of the second embodiment, so that the data stored in the SRAM 21 is held.

As described above, according to the second embodiment, when the voltage level of the main power supply Vmain falls to the first detection level, supplying the clock signal CLK is stopped to stop the operations of the CPU 11b and the like and to inhibit the access of the SRAM 21. When the voltage level is further reduced to the second detection level, the main power supply Vmain is disconnected from the first internal node Ne and the power supply connected to the second internal power supply node Ni is switched from the main power supply Vmain to the subordinate power supply Vbat to stop supplying power to the CPU 11b and the like and the subordinate power supply Vbat is supplied only to the SRAM 21d and the use of the subordinate power supply Vbat falls to a minimum amount. In this manner, when the voltage level of the main power supply Vmain falls, data can be held with reliability and the life of the subordinate power supply Vbat can be improved.

Modifications

In the second embodiment, when the voltage level of the main power supply Vmain falls, the subordinate power supply Vbat is supplied only to the volatile memory that needs to be supplied with power so as to hold necessary data. Therefore, as compared with the first embodiment in which the necessary data is backed up in the nonvolatile memory, the second embodiment has a smaller number of components mounted thereon and hence has an advantage in cost.

Moreover, in the first embodiment, when the main power supply Vmain is recovered, to return the microcomputer to the state before power off, the processing of reading backup data from the nonvolatile memory and setting it again in the volatile memory. is necessary. However, in the second embodiment, the contents of the volatile memory are held until the main power supply Vmain is recovered. Hence, when the main power supply Vmain is recovered and the clock signal CLK is again supplied, the operation can be continued immediately.

Although a case where the inner circuit includes an SRAM as a volatile memory has been described in the second embodiment, the present invention can be applied also to a case where the inner circuit includes a register such as a flip-flop and a latch in replace of the SRAM.

Moreover, the NAND circuit 19 in the first embodiment can be replaced with another logic circuit having the same function as the NAND circuit 19.

Furthermore, the power supply switching circuit of the present invention can be applied especially to a data processing device having a resuming function in a mobile terminal device basically energized by a battery such as a mobile cellular telephone, a digital still camera, and a Personal Digital Assistance (PDA).

The invention being thus described, it will be obvious that the same may be varied in many ways. Such variations are not to be regarded as a departure from the spirit and scope of the invention, and all such modifications as would be obvious to one skilled in the art are intended to be included within the scope of following claims.

What is claimed is:

1. A power supply switching circuit for switching power supplied to an internal power supply node in a data processing device from a main power supply to a subordinate power supply, the data processing device including an internal circuit which receives power via the internal power supply node, the power supply switching circuit comprising:
   a detection circuit which detects a reduction in a voltage level of the main power supply to a predetermined detection level, the detection circuit outputting a detection signal for causing the internal circuit to perform data backup when the reduction in the voltage level to the predetermined detection level is detected by the detection circuit;
   a first switch circuit disposed between the main power supply and the internal power supply node, wherein the first switch circuit connects the main power supply to the internal power supply node before the reduction in the voltage level to the predetermined detection level is detected by the detection circuit and disconnects the main power supply from the internal power supply node when the reduction in the voltage level to the predetermined detection level is detected by the detection circuit; and
   a second switch circuit disposed between the subordinate power supply and the internal power supply node, wherein the second switch circuit disconnects the subordinate power supply from the internal power supply node before the reduction in the voltage level to the predetermined detection level is detected by the detection circuit, connects the subordinate power supply to the internal power supply node from when the reduction in the voltage level to the predetermined detection level is detected by the detection circuit to when the data backup is completed in the internal circuit, and subsequently disconnects the subordinate power supply from the internal power supply node when the data backup is completed in the internal circuit.

2. The power supply switching circuit according to claim 1, further comprising a connection terminal of the main power supply;
   wherein the first switch circuit includes a MOS transistor disposed between the connection terminal of the main power supply and the internal power supply node;
   wherein the MOS transistor includes:
   a gate electrode which receives the detection signal output from the detection circuit when the reduction in the voltage level to the predetermined detection level is detected by the detection circuit; and
   a substrate connected to the connection terminal of the main power supply.

3. The power supply switching circuit according to claim 1, further comprising a connection terminal of the subordinate power supply;
wherein the second switch circuit includes:
a logic circuit which receives a detection signal output from the detection circuit when the reduction in the voltage level to the predetermined detection level is detected by the detection circuit and a backup completion signal output from the internal circuit when the data backup is completed in the internal circuit; and
a MOS transistor disposed between the connection terminal of the subordinate power supply and the internal power supply node, the MOS transistor including a gate electrode which receives an output signal of the logic circuit.

4. The power supply switching circuit according to claim 1, wherein the detection circuit includes:
a voltage dividing resistor circuit which generates a divided voltage of a voltage supplied from the main power supply;
a reference voltage generating circuit which generates a reference voltage; and
a comparison circuit which compares the divided voltage with the reference voltage, thereby producing the detection signal when the divided voltage is not higher than the reference voltage.

5. The power supply switching circuit according to claim 4, further comprising a connection terminal of the subordinate power supply;
wherein the comparison circuit receives power supplied from the connection terminal of the subordinate power supply.

6. The power supply switching circuit according to claim 4, further comprising a connection terminal of the main power supply;
wherein the comparison circuit includes:
a differential input circuit which has differential inputs of the divided voltage and the reference voltage;
a current source circuit which supplies a constant current to the differential input circuit;
an amplifier circuit which amplifies an output signal of the differential input circuit; and
an output circuit including a CMOS transistor, to which an output signal of the amplifier circuit is input;
wherein the differential input circuit, the current source circuit, and the amplifier circuit receives power supplied via the connection terminal of the main power supply, and the output circuit receives power supplied via the connection terminal of the subordinate power supply.

7. A data processing device comprising
a power supply switching circuit for switching power supplied to an internal power supply node in a data processing device from a main power supply to a subordinate power supply; and
an internal circuit which receives power via the internal power supply node, the internal circuit including a non-volatile memory for data backup;
wherein the power supply switching circuit comprises:
a detection circuit which detects a reduction in a voltage level of the main power supply to a predetermined detection level, the detection circuit outputting a detection signal for causing the internal circuit to perform data backup when the reduction in the voltage level to the predetermined detection level is detected by the detection circuit;
a first switch circuit disposed between the main power supply and the internal power supply node, wherein the first switch circuit connects the main power supply to the internal power supply node before the reduction in the voltage level to the predetermined detection level is detected by the detection circuit and disconnects the main power supply from the internal power supply node when the reduction in the voltage level to the predetermined detection level is detected by the detection circuit; and
a second switch circuit disposed between the subordinate power supply and the internal power supply node, wherein the second switch circuit disconnects the subordinate power supply from the internal power supply node before the reduction in the voltage level to the predetermined detection level is detected by the detection circuit, connects the subordinate power supply to the internal power supply node from when the reduction in the voltage level to the predetermined detection level is detected by the detection circuit to when the data backup is completed in the internal circuit, and subsequently disconnects the subordinate power supply from the internal power supply node when the data backup is completed in the internal circuit.

8. A method of controlling a power supply switching circuit, the power supply switching circuit switching power supplied to an internal power supply node in a data processing device from a main power supply to a subordinate power supply, the data processing device including an internal circuit which receives power via the internal power supply node, the method comprising:
detecting a reduction in a voltage level of the main power supply to a predetermined detection level;
outputting a detection signal for causing the internal circuit to perform data backup when the reduction in the voltage level to the predetermined detection level is detected;
connecting the main power supply to the internal power supply node before the reduction in the voltage level to the predetermined detection level is detected and disconnecting the main power supply from the internal power supply node when the reduction in the voltage level to the predetermined detection level is detected; and
disconnecting the subordinate power supply from the internal power supply node before the reduction in the voltage level to the predetermined detection level is detected, connecting the subordinate power supply to the internal power supply node from when the reduction in the voltage level to the predetermined detection level is detected to when the data backup is completed in the internal circuit, and subsequently disconnecting the subordinate power supply from the internal power supply node when the data backup is completed in the internal circuit.

* * * * *